United States Patent [19]

Slocum et al.

[11] Patent Number: 4,685,661
[45] Date of Patent: Aug. 11, 1987

[54] METHOD AND MECHANISM FOR FIXTURING OBJECTS

[75] Inventors: Alexander H. Slocum, McLean, Va.; James P. Peris, Germantown, Md.

[73] Assignee: The United States of America as represented by the Secretary of Commerce, Washington, D.C.

[21] Appl. No.: 747,486

[22] Filed: Jun. 21, 1985

[51] Int. Cl.⁴ .............................................. B23Q 3/00
[52] U.S. Cl. ...................................... 269/20; 269/25; 269/156; 269/266; 269/271; 269/279
[58] Field of Search ................. 269/20, 156, 244, 257, 269/271, 279-284, 24, 25, 32, 266

[56] References Cited

U.S. PATENT DOCUMENTS

| Re. 22,641 | 5/1945 | Barnes | 269/277 |
| 2,195,277 | 3/1940 | Kleinman | 269/271 |
| 4,054,281 | 10/1977 | Martinsson | 269/155 |
| 4,380,939 | 4/1983 | Gardner | 269/20 |
| 4,565,358 | 1/1986 | Hosoi et al. | 269/60 |
| 4,582,306 | 4/1986 | Sassenberg | 269/282 |

Primary Examiner—Frederick R. Schmidt
Assistant Examiner—Judy J. Hartman
Attorney, Agent, or Firm—Eugene J. Pawlikowski; Alvin J. Englert; Mitchell W. Shapiro

[57] ABSTRACT

A programmably controllable vise has mechanisms for automatic adjustment of workpiece position relative to three orthogonal axes. The positions of the vise jaws (during clamping) establish workpiece position along a first axis, and stop members (e.g., piston actuated stops) selectively extendable from the jaws establish workpiece position along a second axis. Two levelling bars supported adjacent the jaws by respective servo-actuators (e.g., double-acting piston type actuators) which adjust the bars along the jaws establish workpiece position along the third axis, as well as workpiece tilt about the first and second axes. Because the adjustments may be made automatically, the vise may operate unattended, with workpieces being loaded and unloaded by a robot. The vise jaws preferably incorporate replaceable jaw elements which are constructed for attachment and removal by a robot and which may be machined to accommodate non-prismatic workpieces. One of the jaws may be fixed to a housing of the vise, with the other jaw being supported on a movable carriage driven by a feedback-controlled linear drive. An open side of the housing adjacent the jaws is protectively covered by a sheet metal band wrapped around the housing and having opposite ends respectively attached to the front and rear of the carriage. The band circulates around the housing with movement of the carriage, and the open side of the housing thus remains covered to avoid the entry of contaminants.

47 Claims, 7 Drawing Figures

METHOD AND MECHANISM FOR FIXTURING OBJECTS

BACKGROUND OF THE INVENTION

This invention addresses the problem of how to remotely position, orient, and clamp an object, which can be of virtually any size and shape within given limits, using a single fixturing device in a manner suitable to permit a machine to perform a task on the part. Such remote controlled reprogrammable fixturing devices will be required for use in automated factories, in particular those which use robots to load and unload parts. Specifically, the invention concerns a computer controlled workholding fixture with three programmable position degrees of freedom and one angular degree of freedom that are used to justify a prismatic part's location, and robotically changeable, disposable jaws, which can be machined to be of the proper shape required to hold a non-prismatic part. Currently, parts are held by dedicated fixtures which are assembled off-line by human operators. Some fixtures can be remotely controlled to clamp or release a part, but no presently available fixture can reconfigure itself to handle a wide variety of part types.

As industry becomes more automated, and factories are designed to operate "lights out" 24 hours per day, a need arises for a fixturing system that is as flexible as the machine tool it services. The increasing use of robots in flexible manufacturing systems also creates a need for fixtures which can be tended by robots. Similarly, a large portion of the high cost of prototype mechanisms is attributable to the setup time required to machine the parts.

A major part of the setup time is required to position, orient, and clamp the part with respect to the machine tool. The fixturing options presently available for use in automated manufacturing can be divided into two groups: those which are assembled on the machine tool, and those which are assembled on pallets which are then loaded onto the machine tool. Both types may use jigs or fixtures designed specifically for a part, or the fixture may be built up from basic building blocks (e.g. tombstones, clamps, vises); however, they consist of simple clamps and vises which require the skill of a machine operator to set them up. This requirement for a machine operator does not allow for 24 hour untended factory operation. If, however, the fixturing system could be electronically controlled, it would be possible to coordinate the actions of a robot, a machine tool, and a fixturing system to yield a workstation that could handle a variety of parts without requiring a human operator.

For high productivity, the machine tool should be continually operated (e.g. cutting metal). Thus, for all but high volume production runs, the fixturing system should be able to be changed as quickly as the cutting tools used on the machine. Additionally, like qualified tooling having dimensions carefully preset in the tooling room to ensure accuracy, the fixture must be able to hold a part in a known orientation and position with respect to the machine. The only way to accomplish the foregoing using present methods, however, is to use a palletized system which does not allow for untended operation of the factory as discussed above and which requires the transportation of large, heavy pallets from machine to machine a very inefficient, slow, and expensive process. If the proper fixturing system were available such that only the transportation of parts were necessary, efficiency and speed of machining operations could be significantly improved and costs substantially reduced.

Little work has been done in design of remotely controlled fixturing systems that can handle a wide variety of parts. Examples of the prior art include U.S. Pat. Nos. 4,437,654, and 4,251,066 to Chiappetti and Bowling, respectively, which describe replaceable jaws for manual vises. It should be noted that them described are fitted by sliding the jaws into various types of mechanical grooves, and then locking them in place with a bolt. The sliding of jaws into grooves can be difficult for a robot, and if the geometries shown were used in a computer controlled machining center which uses a spray stream of coolant, the jaw/vise interface would become contaminated and accuracy would be lost. Also, neither patent describes holding a blank jaw in the vise, and then using the machine tool to machine the desired shape into the jaw for holding an odd shaped part. Furthermore, the mechanisms described do not provide adequate positioning accuracy for the jaws if a blank jaw with a special shape was used to hold a part.

In another example of the prior art, U.S. Pat. No. 3,463,479 by Hennessey describes a grid of holes machined into the face of a vise jaw and into which pins can be manually inserted to act as variable position supports to hold a part; however, this system cannot be computer controlled and thus is not suitable for use in a computerized factory. Also, only discrete positioning is possible, levelling of non-flat parts cannot be accomplished.

Other examples of current fixturing methods include hold down clamps which are used primarily to hold plate type parts, or castings at their base. Hydraulic swing clamps are now widely available, and they can be arranged in a grid and controlled by electronically controlled solenoid valves. This type of arrangement, however, can only accomodate wide, flat parts or parts with hold down tabs.

Perhaps the other most common fixture in use today is a simple machine tool vise which may be hand or mechanically powered. To effectively use a vise, an operator uses parallels to set the height of a part. One edge is forced against a fixed anvil by a moving anvil (jaw), and the remaining reference needed to position the part is obtained using a stop, or an edge finder.

In contrast to these simple devices which must be set up by a human operator, the ideal remote controlled, reconfigurable fixturing system must be able to position, orient, and clamp two categories of parts: prismatic and non-prismatic. The former are easily handled by a vise type system, while the latter may require special jigs to accomodate various geometric shapes. The key to all fixturing, however, is how to present the part to the machine tool and how to maintain a holding/clamping force during the machining process.

Clearly one fixture cannot be called upon to handle all fixturing needs of a flexible manufacturing system, but a hierarchical mechanical system, which provides a base to which specialized fixtures can be attached, could handle most fixturing needs. Note that in a hierarchical computer controlled flexible manufacturing facility, "idle" machines could be directed to manufacture fixture attachments using downloaded numerical control programs generated from a CAD/CAM generated model of the part to be fixtured. Since a robot cannot compute with human dexterity when it comes to bolting things down, advantage will be taken of a hierarchical computer controlled facility's ability to schedule jobs and download parts programs to workcells which use a remote controlled flexible fixturing system to manufacture disposable fixturing attachments on line. This will require more metal to be cut, but fixturing inventories and setup time will be reduced. This will allow for the automation of small batch jobs, and will allow them to be run overnight with the lights out.

SUMMARY OF THE INVENTION

Accordingly, it is the objective of the present invention to provide an off-line programmable-computer-controlled fixturing system that can reconfigure itself accurately and rigidly to hold prismatic parts in a way that allows a machine tool accurately to machine the part.

Another objective is to provide a fixturing system that allows a robot easily to change the fixturing system's jaws, which contact the part to be held by the vise, such that large blank jaws can be put on the fixturing system, machined (pre-machined jaws can also be used), and then used to hold a non-prismatic shaped part; thus a large inventory of special fixtures would not have to be kept because fixturing requirement plans would be electronically sent along with the part plans.

The foregoing objectives are attained, generally, in a system to position, orient, and rigidly hold a part in space that includes: two jaws, which move with respect to each other, to provide the clamping force necessary to hold an object; two adjustable levelling bars, one in front of each jaw, which are used to justify the depth (how far the part protrudes from the tops of the jaws) and the tilt of a part in the jaws; adjustable stops which justify the lateral position of the part in the jaws; and replaceable jaw elements, which are the interface between the jaws and the part and which can be changed by a robot. The replaceable jaws may have part contact surfaces of any shape required to hold a specially shaped object.

BRIEF DESCRIPTION OF THE DRAWINGS

The invention is hereinafter described with reference to the accompanying drawing in which.

DESCRIPTION OF THE PREFERRED EMBODIMENTS

Using the above figures as illustrative guides, the applicants' solution to the problem of positioning and orienting an object with respect to a machine tool using a remote controlled device will be discussed in detail below.

Figure 1:
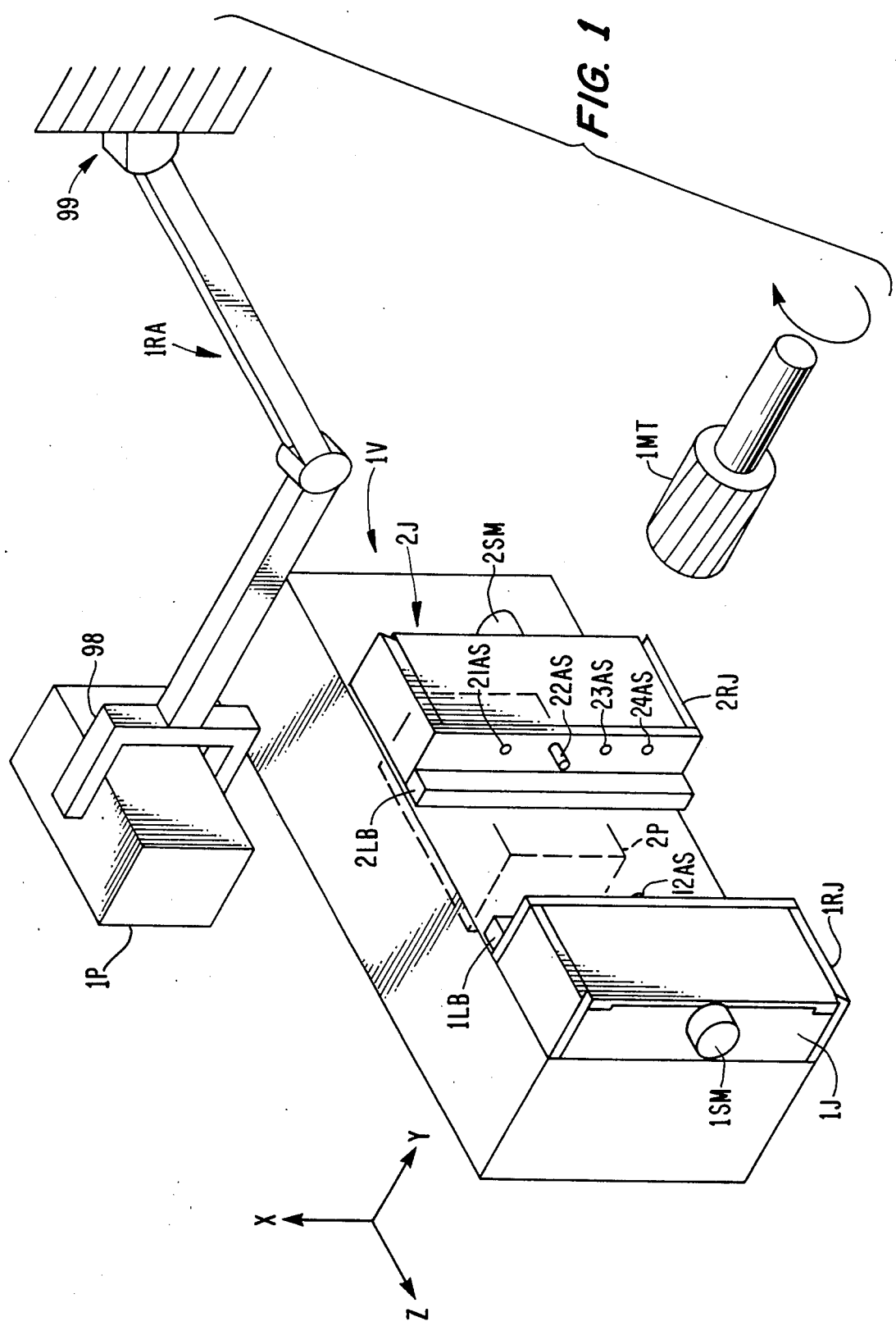
FIG. 1 is a perspective view of a general prismatic part being loaded by a robotic device into a fixturing device according to the invention.

To define the position of an object in space, three cartesian and three angular positions must be established. FIG. 1 shows a generic prismatic part 1P being held by a robot end effector 98 for insertion into a vise 1V. A robotic arm 1RA, which is attached to some reference 99, is used to place the object in the vise 1V. A tool 1MT would then be used to machine the part when it is held in a desired position designated by the dashed lines 2P. Since the object is prismatic, its parallel edges can be seated against parallel planes of the vise 1V; thus defining the orientation of the part. A jaw 1J is fixed to the vise which is fixed with respect to the machine tool; thus by using a moving jaw 2J to press one edge of the object 1P against the fixed jaw 1J, the object's Z position will be known. Levelling bars 1LB and 2LB, which are described in greater detail below, are servo-actuator controlled and are used to adjust the Y position of the part and the orientation about the Z axis. Adjustable stops 22AS and 12AS, which are described in greater detail below, extend from a grid of stops (e.g., 21AS-23AS shown on the moving jaw 2J) used to establish the X position of the object.

Figure 2:
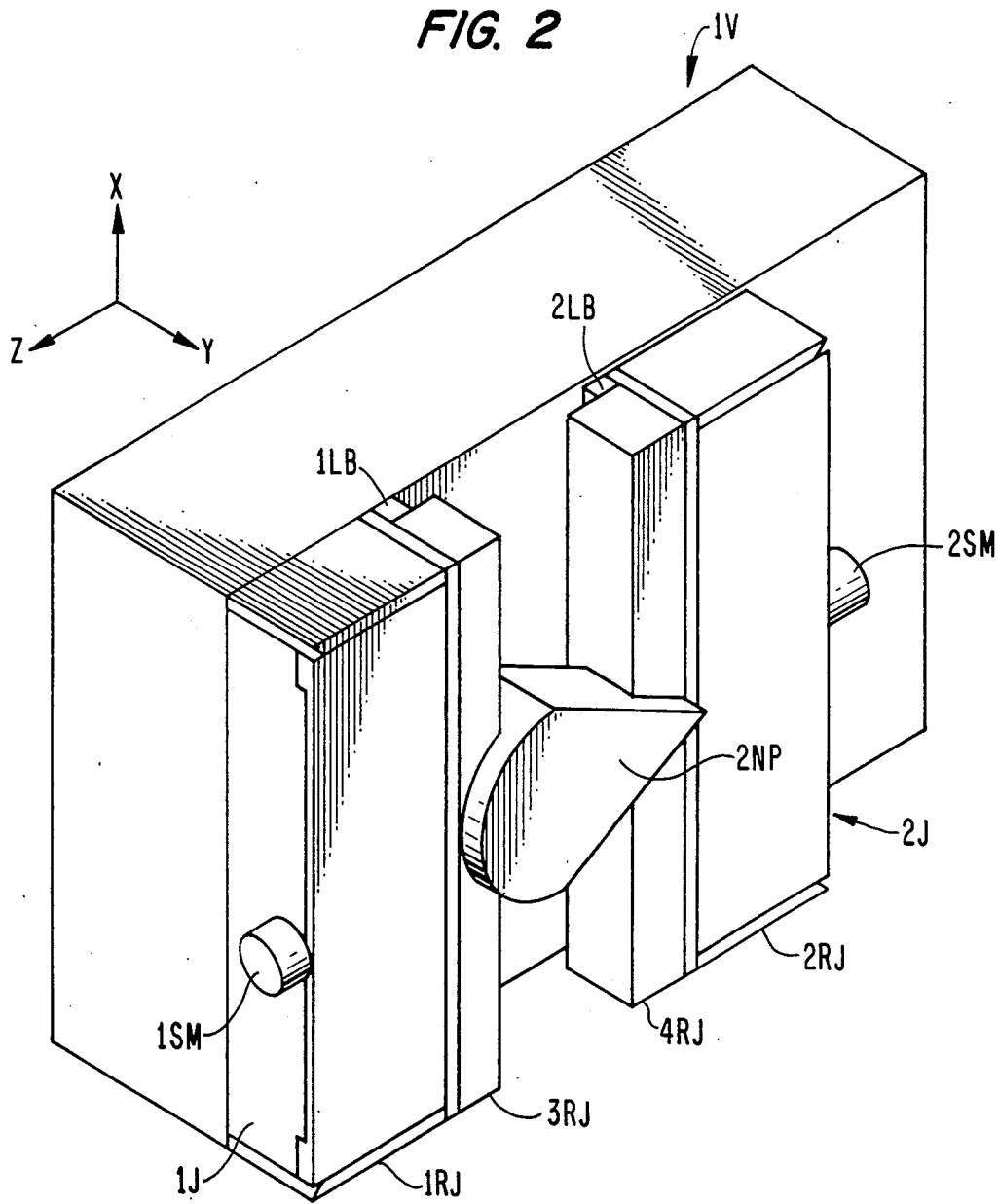
FIG. 2 is a perspective view of a general non-prismatic part being held by replaceable jaws in the device of FIG. 1.

For non-prismatic parts, and some special prismatic parts (such as thin plates) the jaws may include removable surfaces which can be changed by a robot, and part position and orientation will be established by the shape of the jaw used to hold the part. As shown in FIG. 2, a non-prismatic part 2NP is held in the vise 1V by fixed and moving jaws 1J and 2J which have replaceable jaws 1RJ and 2RJ attached to them. Note that replaceable jaws 1RJ and 2RJ are of the same type used to hold the prismatic part as shown in FIG. 1, with machinable plates 3RJ and 4RJ added respectively. This allows the inexpensive production of numerous replaceable jaw blanks, to which machinable surfaces can be added (held by adhesives, bolts, pins, etc.) as needed. In this manner, a large inventory of fixturing does not have to be kept. The fixturing can be machined prior to the part, and either stored or discarded after the part is machined.

The construction of the vise is shown in more detail in FIG. 3, and will be discussed prior to the detailed operation. The vise position and orientation will be fixed with respect to the machine tool by using a standardized attachment technique, such as bolting to the machine tool bed or a pallet. The vise 1V has one fixed jaw 1J with a replaceable jaw 1RJ anchored to it, and one moving jaw 2J which also has a replaceable jaw 2RJ attached to it. The moving jaw 2J is integral with a carriage 1C driven by ballscrew 46BS which has a sprocket 44S at one end. The tip of the ballscrew passes through an end bulkhead or plate 4EC and has a nut 4SN threaded on the end to transfer reaction closing forces from the moving jaw through the ballscrew into the bulkhead. A chain 42C transfers rotational power from a hydraulic motor/sprocket assembly 41HM/43S to the ballscrew which converts the rotary power to linear power.

For ease of machining and for reduction in weight, the main body of the vise is made of aluminum. One possible construction is shown here, where the box structure of the vise is attained by bolting and pinning together aluminum plates using bolts and pins such as 14B and 13DP, respectively. The structure includes side plates 6SP and 7SP and end plates 4EC and 5EC, and a bottom plate 5B. This box structure gives the vise extreme rigidity about all axes. The carriage 1C is made of a cast ductile iron. Because a part can be held anywhere on the jaws, the carriage 1C is supported by a fully constrained bearing system which only allows motion along the Z axis. For ease of force control and compactness, a specially designed angular contact recirculating roller bearings whose preload is insensitive to uniform temperature fluctuations is used.

Figure 7:
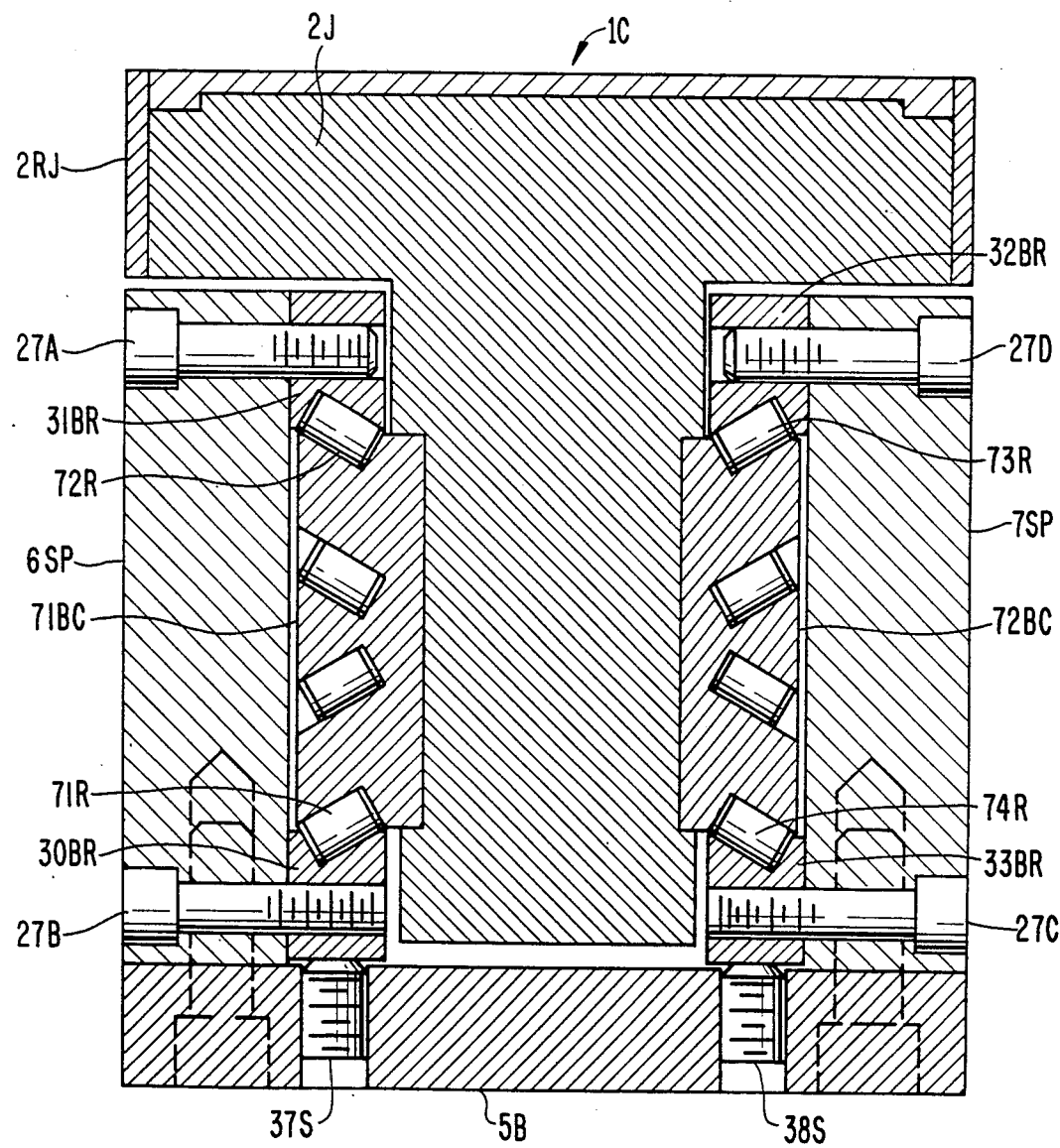
FIG. 7 is a cross section of a possible configuration for a linear bearing system for a moving jaw of the fixturing device.

The bearing system is shown in greater detail in FIG. 7 and consists of fixed top rails 31BR and 32BR and bottom rails 30BR and 33BR height adjustable in the Y direction. The height of the bottom rails is adjusted by set screws such as 37S and 38S and the rails are locked in place with bolts such as 27B and 27C. Four tracks of recirculating roller bearings 71R–74R ride in hardened steel blocks 71BC, and 72BC respectively, and contact their respective bearing rails at an angle which is chosen such that the proper stiffness about the axes is attained, and also so as the temperature of the structure changes and the structure expands, the bearing preload remains the same. Thus the carriage 1C can move in the Z direction, but all other motions are restricted by the bearings which transfer the loads to the side plates 6SP and 7SP and the bottom plate 5B. All bearing components are made from hardened steel to resist wear and brinelling.

To prevent chips and coolant from contaminating the ballscrew and bearings, a thin sheet metal band 60SM (FIG. 3) is used. Unlike bellows or sliding telescopic sheet metal covers which require a large share of space in the overall structure, the sheet metal band 60SM can be attached to the front of the carriage 1C, pass over half-round low friction surfaces 157 and 158, underneath the vise, up along the other end of the vise around similar sets of rollers, and attached to the rear of the carriage. This novel method of sealing the vise does not require any significant increase in the size of the vise, whereas a bellows or sliding telescopic covering would add 25% to the size. Thus by using the sheet metal wrap design, the part-to-fixture-size ratio can be maximized to increase productivity and efficiency.

In front of the fixed and moving jaws 1J and 2J are adjustable parallel levelling bars 1LB and 2LB, respectively. The Y positions of the levelling bars are controlled by hydraulic pistons, for establishing the Y position of a part. Hydraulic pistons are chosen because of the compactness of their design, although in some applications a ballscrew/motor design may be useful. Hydraulic piston actuators 82A and 82B along with linear position measuring devices 92A and 92B can be seen in FIG. 3 and provide the mechanical components of the servo-actuator system needed to accurately position the levelling bar 2LB. More particularly in the form shown, the levelling bar 1LB extends over the housing side plates, and the actuators for the levelling bar are carried by the respective side plates and connected to the portions of the levelling bar extending over the side plates. See FIG. 4. A similar system is used for levelling bar 1LB. Methods of controlling the position of the ends of the levelling bars are known to those skilled in the art of numerical control.

Figure 6:
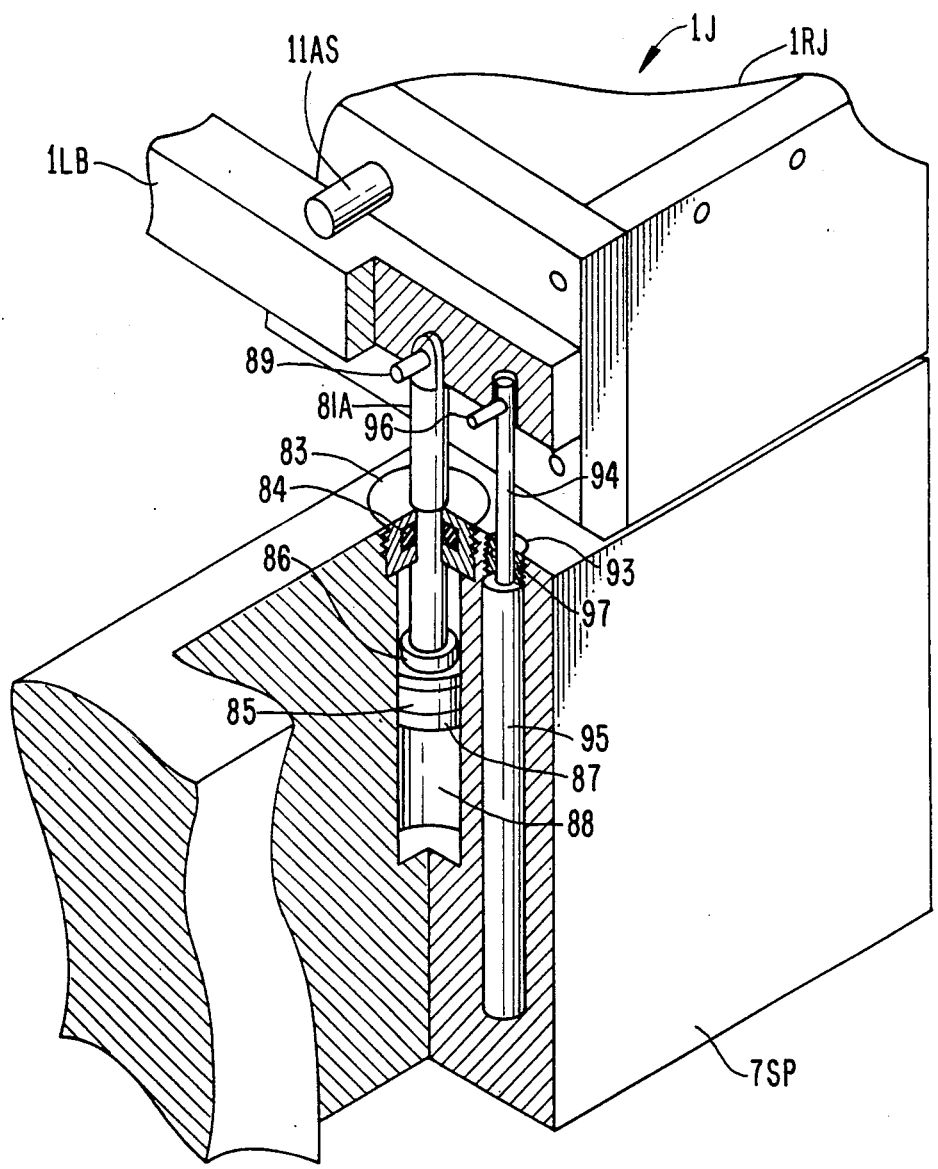
FIG. 6 is a perspective partially cutaway view of a levelling bar and a possible configuration for the actuating and sensor system components used to position the levelling bar.

The construction of a typical piston/position transducer pair for levelling bar adjustment is shown in greater detail in FIG. 6. In the arrangement of FIG. 6, a piston rod 81A is anchored to the levelling bar 1LB by a pin 89 which allows the levelling bar to be used as a sine bar without imposing a bending moment on the piston rod; thus a part's orientation about the Z axis can be adjusted. The piston rod 81A extends through a bushing 83, which has a seal 84 to prevent leakage of hydraulic oil, and is connected to a piston 87 disposed within a bore 88 in side plate 7SP. Note that the piston is double acting, so oil is directed to the rear of the piston to extend it, and to the front of the piston to retract it. A seal 85 prevents leakage of oil around the piston 87, and a lip 86 prevents the piston from seating against the bushing 83 when the piston is fully extended. In some instances, a mechanical spring could be used to lower the levelling bar, while oil pressure would be used to achieve the high forces necessary to support heavy loads on the levelling bar; however, for minimum space, and maximum performance, which requires the bushing 83 to be a snug fit around the piston rod 81A, it is preferred that hydraulic pressure, which can generate ten times the force of a spring in the same area, be used to prevent the piston from sticking. In a manner similar to the piston assembly, a linear position measuring device such as an LVDT or a potentiometer is attached to the levelling bar. The stem 94 of the measuring device 95 is held to the levelling bar 1LB by a pin 96 which transfers linear motion to the stem, but does not allow the levelling bar to bend the stem. A bushing 93 keeps the body of the measuring device 95 firmly seated in the side plate 7SP and a seal 97 prevents contaminants from harming the measuring device.

The X position of a part in the jaws is selectively established at discrete locations by the use of adjustable stops on the fixed and moving jaws. These adjustable stops are shown in FIGS. 1, 3, and in greater detail in FIG. 4. With reference to FIGS. 1 and 3, on the moving jaw 2J, adjustable stop 22AS is shown extended while adjustable stops 21AS, 23AS, and 24AS are retracted. On the fixed jaw, only the tip of the extended adjustable stop 12AS is visible in FIG. 1. These stops are actually the tips of rods attached to hydraulic pistons which are actuated to extend or retract the stops. The adjustable stops can be located so that those on the fixed and moving jaws are colinear, which will allow a long thin part to be supported in the jaws without twisting about the Y axis, or they can be staggered. For robotic loading operations, which require the jaws to open about ½″ wider than the part, the former arrangement is desirable.

Figure 4:
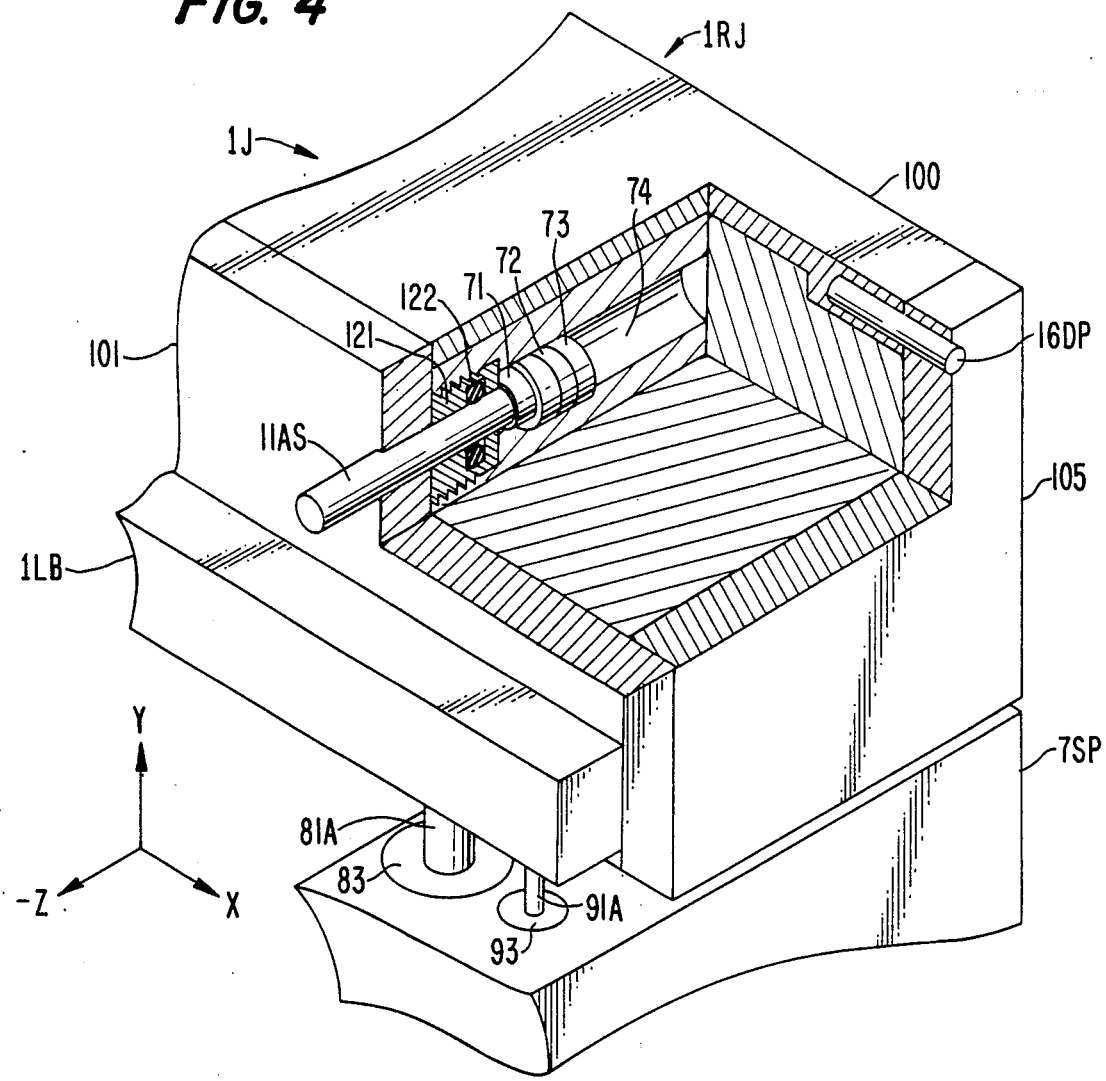
FIG. 4 is a perspective partially cutaway view of a portion of the fixturing device which shows a possible configuration for the actuating mechanism for adjustable stops of the device.

FIG. 4 shows adjustable stop 11AS which is located in the fixed jaw 1J. The adjustable stop 11AS is actually the rod of a hydraulic piston 73 and extends through a bushing 121 which has a seal 122 to prevent leakage of hydraulic oil. Piston 73 fits a bore 74 in jaw 1J, and the bushing 121 is precision machined. The precision machining of the bushing 121 combined with the fit of the piston 73 in the bore 74 minimizes lateral motion of the piston, which would result in an error in the X direction. For ultra-precision work, the lateral motion can be periodically measured and included as a known offset when programming the machine tool used to machine the object. Note that the piston is double acting, that is, oil is directed to the rear of the piston to extend it, and to the front of the piston to retract it. A seal 72 prevents leakage of oil around the piston 73, and a lip 71 prevents the piston from seating against the bushing 121 when the piston is fully extended. In some instances, a mechanical spring could be used either to extend or retract the piston, while oil pressure would be used to achieve the complementary motion; however, for minimum space, and maximum performance, which requires the bushing to be a snug fit around the shaft of the adjustable stop 11AS, it is preferred that hydraulic pressure, which can generate ten times the force of a spring in the same area, be used to prevent the piston from sticking.

It should be noted that in some applications continuous resolution of in controlling an object's position in the jaws in the X direction may be desirable, instead of the adjustable discrete position stops described above. For this case, a piston/linear measuring device mechanism such as described above for the levelling bars can be added to the jaws to act in the X direction; however, the system will be much larger than that of the adjustable stops. Still this option is presented because it may be useful on some large machine tools.

Figure 5:
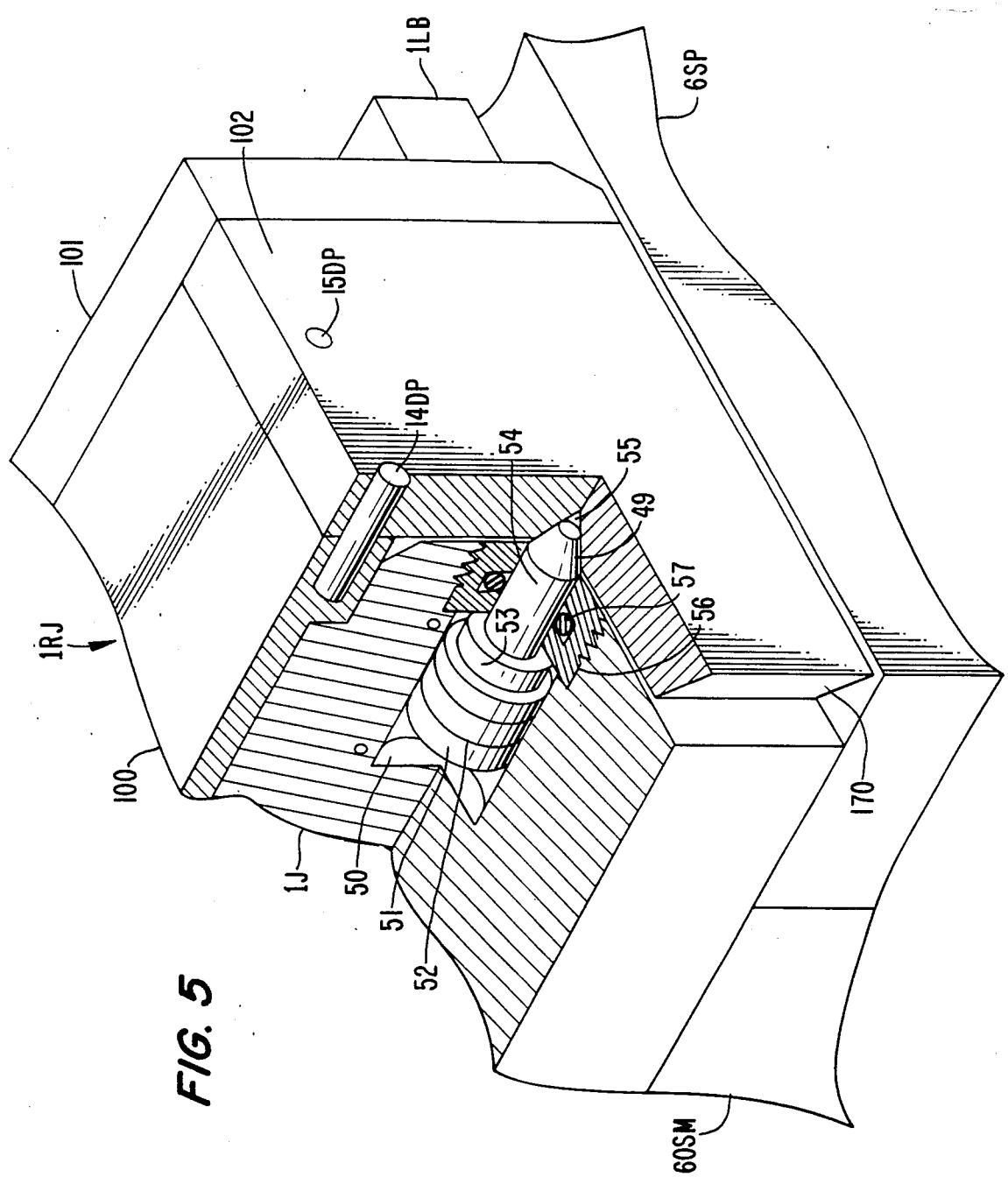
FIG. 5 is a perspective partially cutaway view of a portion of the fixturing device which shows a possible configuration for the actuating mechanism for a tapered piston (one of two) used to lock replaceable jaws in place.

For non-prismatic parts, and some special prismatic parts (such as thin plates), the jaws need to have removable surfaces which can be changed by a robot, and part position and orientation will be established by the shape of the jaw used to hold the part. In order for the replaceable jaw concept to work in an automated machine environment, a mechanism must be provided that allows a robot to remove and replace the jaws easily and which then securely locks the jaws in a known fixed position in a manner which does not allow chips and coolant from the machining process to contaminate the alignment surfaces. This is accomplished as shown in detail in FIG. 5. The replaceable jaw is composed of four surfaces: two side plates (of which 102 is visible in this partial outaway drawing), a top plate 100, and a faceplate 101. Whether machined from a solid, or assembled from individual plates and held with dowel pins such as 14DP and 15DP, the replaceable jaws should enshroud the structural part 1J (the base part) of the jaw. The leading edges of the replaceable jaw which fit over the structural or base part of the jaw first have generous bevels such as 170 to aid a robot in guiding the replaceable jaws over the structural or base parts of the jaws. Once the repleaceable jaw 1RJ is roughly in place, the tapered tip 49 of a piston rod 54 is extended into a tapered hole 55 machined into side plate 102. The action of the tapered tip piston rod is to pull the jaw down and back so it is firmly seated against the front and top of the base part of the jaw. In this manner, a positive seal is maintained, so that in addition to knowing precisely where the jaw is, contaminants are prevented from disrupting the interface between the fixed and removable parts of the jaws.

In a manner similar to that described above in the operation of the adjustable stops, a double acting hydraulic piston 51 is used to activate the piston rod 54, because a spring mechanism would be too large to fit into the jaws. Machined integral with the base structure of jaw 1J, is a piston bore 50 which the shaft of rod 54 of the hydraulic piston fits. One end of the rod has the piston 51 attached to it, and a seal 52 prevents leakage of fluid from one side of the piston to the other. A lip 53 prevents the piston from making a seal with the bushing 56 when it is all the way forward which would prevent the fluid from being able to retract the piston. The other end of the rod 54 has the taper 49 on it. A bushing 56 keeps the rod centered, and a seal 57 prevents leakage of fluid out of the bore 50.

Figure 3:
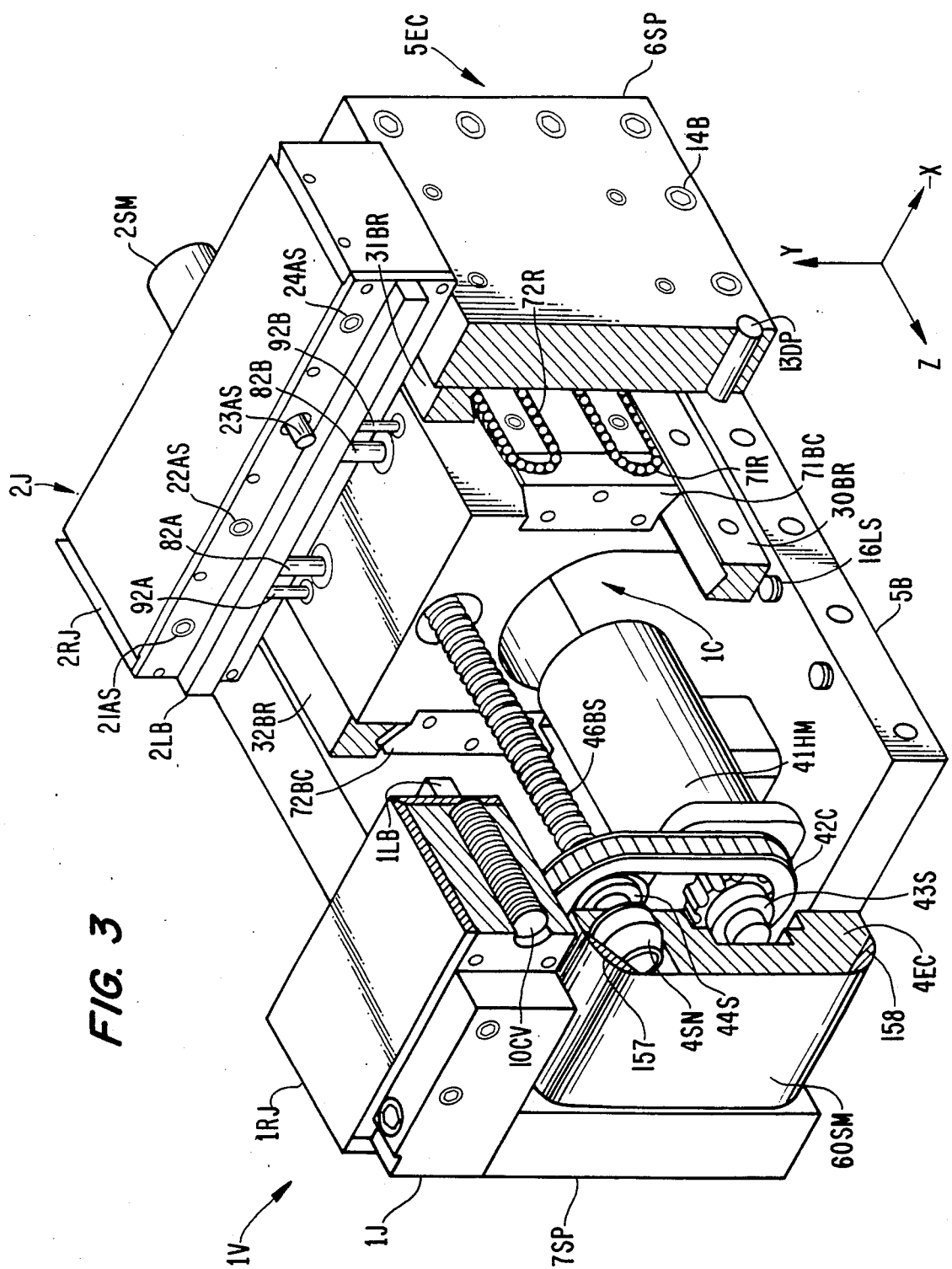
FIG. 3 is a perspective partially cutaway view of the fixturing device.

In order to actuate the adjustable stops and the tapered pistons that anchor the jaws, a specially designed rotary commutator valve 10CV shown in FIG. 3 is used. The valve has different stages which direct fluid to the desired piston ports. One valve is machined integral with each jaw, and by controlling the rotary position of the valves using stepper motors 1SM and 2SM respectively, the desired adjustable stop or tapered piston can be actuated.

Position control of the carriage is obtained using a linear or rotary feedback system typical of machine tools that use ballscrews. Force feedback is necessary in order clamp small parts without damaging them, and to clamp large parts prior to making large power cuts. It is also attained using strain or pressure gauges and control methods that are known to those skilled in the art of numerical control.

What is claimed is:

1. A vise for positioning workpieces relative to a first axis, a second axis, and a third axis which are mutually perpendicular, comprising a first jaw, a second jaw, means supporting said jaws for relative movement along said first axis in a plane extending in the directions of said first axis and said second axis such that said jaws may perform a clamping action and a releasing action, positioning means disposed between said jaws and including first and second levelling bar means which extend, respectively, across a workpiece-contacting surface of said first jaw and a workpiece-contacting surface of said second jaw substantially in the direction of said second axis for engaging a workpiece inserted between said jaws to establish the position of the workpiece along said third axis, and actuating means adjustably supporting said positioning means for moving said positioning means along said third axis to adjust said position, said actuating means including first hydraulic servo-actuator means which displaces said first levelling bar means along said third axis and second hydraulic servo-actuator means which displaces said second levelling bar means along said third axis.

2. A vise according to claim 1, wherein said positioning means adjusts tilt of said workpiece about said second axis.

3. A vise according to claim 1, wherein said positioning means adjusts tilt of said workpiece about said first axis.

4. A vise according to claim 1, wherein said first servo-actuator means comprises a pair of servo-actuators supporting opposite end portions of said first levelling bar means and a pair of servo-actuators supporting opposite end portions of said second levelling bar means.

5. A vise according to claim 4, wherein each servo-actuator comprises a hydraulic piston and a piston rod connecting the piston to the respective levelling bar means.

6. A vise according to claim 1, wherein said first levelling bar means is fixed relative to said first jaw along said first axis and said second levelling bar means is fixed relative to said second jaw along said first axis such that said first and second levelling.bar means move relative to one another with said relative movement of said jaws.

7. A vise according to claim 6, wherein said first jaw is fixed to a housing of said vise and wherein said second jaw is mounted on a carriage supported within said housing for movement along said first axis.

8. A vise according to claim 7, wherein said carriage is supported by linear bearings mounted to said housing.

9. A vise according to claim 8, wherein said bearings are inclined contact roller bearings.

10. A vise according to claim 7, wherein said housing comprises a base plate, two spaced side plates attached to said base plate, and two end plates respectively attached to said base plate and to said side plates at opposite ends of said housing.

11. A vise according to claim 10, wherein said first levelling bar means extends over said side plates and wherein said first servo-actuator means includes a pair of servo-actuators each carried by a respective side plate and connected to a portion of said first levelling bar means extending over that side plate to move that portion of said first levelling bar means along said third axis.

12. A vise according to claim 11, wherein each servo-actuator comprises a hydraulic piston received in a bore of the corresponding side plate and a piston rod connecting the piston to said first levelling bar means.

13. A vise according to claim 7, wherein said second levelling bar means is supported on said carriage by said second servo-actuator means which is carried by said carriage.

14. A vise according to claim 13, wherein said second servo-actuator means comprises a pair of servo-actuators supporting opposite end portions of said second levelling bar means.

15. A vise according to claim 14, wherein each servo-actuator comprises a hydraulic piston received in a bore in said carriage and connected to said second levelling bar means a piston rod.

16. A vise according to claim 7, including sheet means extending around said housing and having opposite ends attached to opposite ends of said carriage, said sheet means circulating around said housing with said movement of said carriage and sealing said housing opposite said base plate during said movement of said carriage.

17. A vise according to claim 1, including stop means carried by at least one of said jaws for engaging the workpiece inserted between said jaws to establish the position of the workpiece along said second axis, and additional actuating means adjustably supporting said stop means for movement adjacent a workpiece contacting surface of said one jaw for adjusting the last-mentioned position.

18. A vise according to claim 17, wherein said stop means includes a plurality of stop members carried by said first jaw and a plurality of stop members carried by said second jaw, the stop members of each plurality being spaced along said second axis and selectively extendable toward the opposite jaw by said additional actuating means.

19. A vise according to claim 18, wherein said stop members are piston rods each connected to a corresponding hydraulic piston of said additional actuating means.

20. A vise according to claim 19, wherein said hydraulic pistons are received in respective bores in said jaws and wherein said piston rods move through respective holes in workpiece-contacting surfaces of said jaws under the action of said pistons.

21. A vise according to claim 20, wherein each jaw includes rotary valve means formed therein for distributing hydraulic fluid to said bores in that jaw to control the pistons in said bores.

22. A vise according to claim 21, wherein each rotary valve means is controlled by a corresponding stepper motor.

23. A vise for positioning workpieces relative to a first axis, a second axis, and a third axis which are mutually perpendicular, comprising means supporting a fixed jaw and a movable jaw movable along said first axis in a plane extending in the directions of said first axis and said second axis to clamp workpieces against said fixed jaw, a first levelling member mounted adjacent said fixed jaw, a second levelling member mounted adjacent said moving jaw for movement therewith, said levelling members being disposed between said jaws and establishing a position along said third axis to which a workpiece may be inserted between said jaws, actuating means including first and second servo-actuators adjustably supporting said levelling members respectively for moving said levelling members transverse to said plane to adjust said position along said third axis, said second servo-actuator being mounted for movement with said second levelling member and said moving jaw, stop means carried by said jaws and establishing the position of the workpiece along said second axis, and additional actuating means supporting said stop means for selectively adjusting said stop means along said second axis to adjust said position established by said stop means.

24. A vise according to claim 23, wherein said stop means comprises a plurality of stops mounted to said fixed jaw and extendable toward said moving jaw by said additional actuating means and a plurality of stops mounted to said moving jaw and extendable toward said fixed jaw by said additional actuating means.

25. A vise according to claim 24, wherein the stops of each plurality are spaced along a workpiece-contacting surface of the associated jaw in the direction of said second axis.

26. A vise according to claim 25, wherein said stops are piston rods connected to hydraulic pistons received in corresponding bores in said jaws.

27. A vise according to claim 26, wherein each jaw carries a rotary valve which distributes hydraulic fluid to the piston-receiving bores in that jaw.

28. A vise according to claim 23, wherein each jaw has a base portion and a replaceable jaw element received over said base portion and providing a workpiece-contacting surface facing the other jaw.

29. A vise according to claim 28, wherein said replaceable jaw element includes a top plate, two spaced side plates joined to said top plate, and a face plate joined to said top and side plates which provides said workpiece-contacting surface.

30. A vise according to claim 29, wherein edges of the top and side plates opposite said face plate are bevelled to facilitate placement of said replaceable jaw element over said base portion.

31. A vise according to claim 29, wherein said base portion has a pair of hydraulic pistons mounted in bores at opposite sides of said base portion, each piston having a piston rod extending from within said base portion externally of said base portion, said piston rod having a tapered tip cooperable with a tapered bore within a respective side plate of said replaceable jaw element to draw said replaceable jaw element tightly against said base portion.

32. A vise according to claim 23, wherein each of said servo-actuators is a hydraulic piston-type actuator having a piston rod connected to the corresponding levelling member and linear-position detecting means connected to that levelling member for detecting the position of that levelling member along said third axis.

33. A vise according to claim 23, wherein the means supporting said jaws comprises a housing supporting said fixed jaw and a movable carriage mounted in said housing, for movement along said first axis said moving jaw being fixed to said carriage in the direction of said first axis.

34. A vise according to claim 33, including motor operated linear drive means for moving said carriage along said first axis.

35. A vise according to claim 34, wherein said linear drive means includes a ball-screw drive drivingly engaged with said carriage, and feedback-controlled motor means for drivingly rotating said ball-screw drive.

36. A vise according to claim 33, wherein said housing has an open side adjacent said jaws, and including sheet means covering said open side and extending around said housing with opposite ends of said sheet means being respectively secured to opposite ends of said carriage such that during said movement of said carriage, said sheet means is pulled around said housing to continuously cover said open side of said housing during said movement of said carriage.

37. A vise for positioning workpieces relative to a first axis, a second axis, and a third axis which are mutually perpendicular, comprising a first jaw, a second jaw, means supporting said jaws for relative movement along said first axis in a plane extending in the directions of said first axis and said second axis, first and second levelling bar means mounted adjacent said first jaw and said second jaw, respectively, for relative movement with said jaws along said first axis and for establishing a position along said third axis to which a workpiece may be inserted between said jaws, and first and second servo-actuator means respectively supporting said first levelling bar means and said second levelling bar means for adjustable movement along said third axis, respectively across a workpiece-contacting surface of said first jaw and a workpiece-contacting surface of said second jaw in order to adjust said position established by said first levelling bar means and said second levelling bar means.

38. A vise according to claim 37, wherein said first and second servo-actuator means adjust relative positions of the respective levelling bar means along said third axis to establish workpiece tilt about the direction of said second axis.

39. A vise according to claim 38, wherein said first and second servo-actuator means also adjust the angular positions of the respective levelling bar means about the direction of said first axis.

40. A vise according to claim 37, wherein said jaws carry respective stop means for engaging the workpiece inserted between said jaws to establish the position of the workpiece along said second axis, and including hydraulic actuating means for selectively adjusting the stop means of each jaw along said second axis to adjust said position established along said second axis.

41. A vise according to claim 40, wherein the respective stop means comprise a plurality of hydraulic piston-actuated stops spaced along said first jaw in the direction of said second axis and a plurality of hydraulic piston-actuated stops spaced along said second jaw in the direction of said second axis.

42. A vise according to claim 41, wherein said stops are piston rods connected to respective pistons which extend and retract said rods along said first axis.

43. A vise according to claim 37, wherein the means supporting said jaws comprises a housing supporting said first jaw and a movable carriage mounted in said housing, said second jaw being fixed to said carriage, and including feedback-controlled linear drive means for controlling movement of said carriage along said first axis.

44. A vise according to claim 43, wherein said linear drive means includes a ball-screw drive drivingly engaged with said carriage, and feedback-controlled motor means for drivingly rotating said ball-screw drive.

45. A vise according to claim 43, wherein said housing has an open side adjacent said jaws, and including sheet means covering said open side and extending around said housing with opposite ends of said sheet means being respectively secured to opposite ends of said carriage such that during said movement of said carriage, said sheet means is pulled around said housing to continuously cover said open side of said housing during said movement of said carriage.

46. A vise for positioning workpieces relative to a first axis, a second axis, and a third axis which are mutually perpendicular, comprising a first jaw, a second jaw, means supporting said jaws for relative movement along said first axis in a plane extending in the directions of said first axis and said second axis, first and second levelling bar means mounted adjacent said first jaw and said second jaw, respectively, for relative movement with said jaws along said first axis and for establishing a position along said third axis to which a workpiece may be inserted between said jaws, and first and second servo-actuator means respectively supporting said first levelling bar means and said second levelling bar means for adjustable movement along said third axis in order to adjust said position established by said first levelling bar means and said second levelling bar means, wherein said first and second servo-actuator means adjust relative positions of the respective levelling bar means along said third axis to establish workpiece tilt about the direction of said second axis, and wherein said first and second servo-actuator means also adjust angular positions of the respective levelling bar means about the direction of said first axis.

47. A vise for positioning workpieces relative to a first axis, a second axis, and a third axis which are mutually perpendicular, comprising a first jaw, a second jaw, means supporting said jaws for relative movement along said first axis in a plane extending in the directions of said first axis and said second axis, first and second levelling bar means mounted adjacent said first jaw and said second jaw, respectively, for relative movement with said jaws along said first axis and for establishing a position along said third axis to which a workpiece may be inserted between said jaws, and first and second servo-actuator means respectively supporting said first levelling bar means and said second levelling bar means for adjustable movement along said third axis in order to adjust said position established by said first levelling bar means and said second levelling bar means, said jaws carrying respective stop means for engaging the workpiece inserted between said jaws to establish the position of the workpiece along said second axis, said vise also including hydraulic actuating means for selectively adjusting the stop means of each jaw along said second axis to adjust said position established along said second axis.

* * * * *